United States Patent [19]

Chenebault et al.

[11] Patent Number: 5,098,643
[45] Date of Patent: Mar. 24, 1992

[54] METHOD FOR DETECTING LEAKY RODS IN A NUCLEAR FUEL ASSEMBLY

[75] Inventors: Pierre Chenebault, Grenoble; Clément Lemaignan, Voreppe, both of France

[73] Assignee: Commissariat a l'Energie Atomique, France

[21] Appl. No.: 307,695

[22] Filed: Feb. 7, 1989

[30] Foreign Application Priority Data

Feb. 18, 1988 [FR] France .................. 88 01926

[51] Int. Cl.$^5$ .................................. G21C 17/00
[52] U.S. Cl. ........................ 376/251; 376/250; 376/253; 376/409
[58] Field of Search ............ 376/250, 251, 253, 409

[56] References Cited

U.S. PATENT DOCUMENTS

| 3,936,348 | 3/1976 | Wachter | 376/252 |
| 4,082,607 | 4/1978 | Divona | 376/253 |
| 4,650,637 | 3/1987 | Chubb | 376/253 |

FOREIGN PATENT DOCUMENTS

| 0100941 | 2/1984 | European Pat. Off. |
| 0186554 | 7/1986 | European Pat. Off. |
| 2659555 | 7/1978 | Fed. Rep. of Germany |
| 2509898 | 1/1983 | France |
| 2178858 | 2/1987 | United Kingdom |

OTHER PUBLICATIONS

Lecture: The Contribution of Dounreay to the Development of Fast Reactors, C. W. Blumfield; Nucl. Energy, 1979, vol. 18, Oct., No. 5, 311-326.

Primary Examiner—Donald P. Walsh
Assistant Examiner—Meena Chelliah

[57] ABSTRACT

In order to detect leaky rods inside a nuclear fuel assembly (24), this assembly is placed inside a pool (36) so that the gases contained inside the rods (10) escape from the leaky rods. By heating the upper part of the assembly by means of a heated sleeve (42) the gases contained inside the leaky rods are expanded. Monitoring the diameter change of the rods (10) at the base of the assembly by means of a measuring device (44) makes it possible to distinguish the sealed rods whose sheaths elastically get out of shape from the leaky rods whose sheaths hardly warp at all.

17 Claims, 3 Drawing Sheets

FIG. 1
FIG. 2
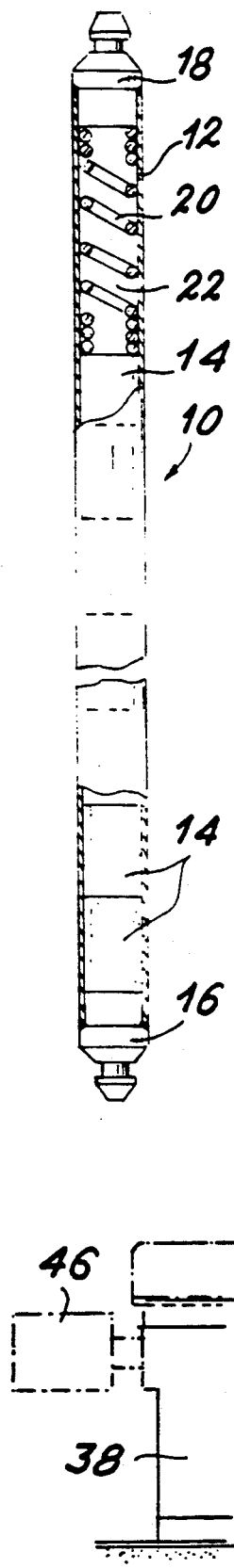
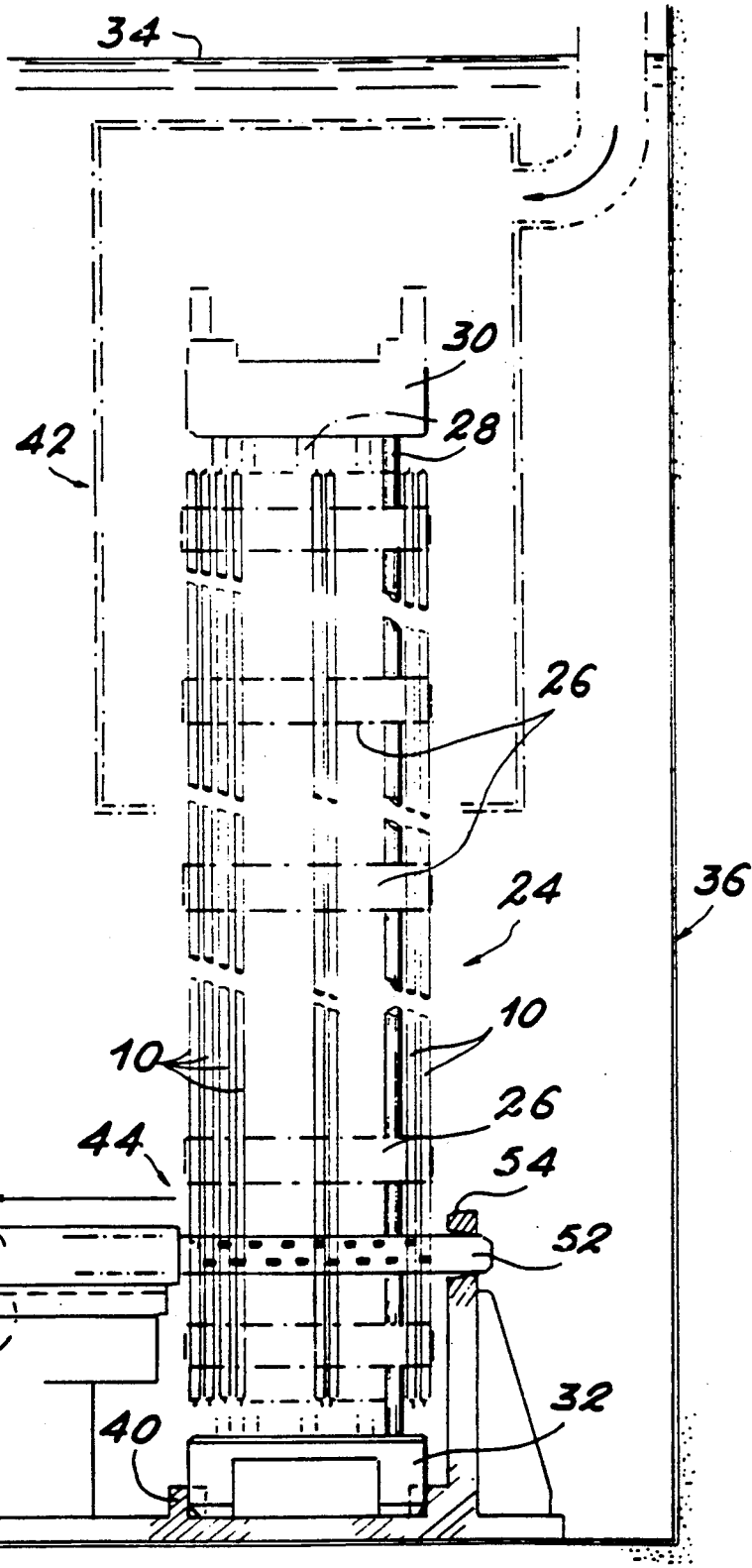

METHOD FOR DETECTING LEAKY RODS IN A NUCLEAR FUEL ASSEMBLY

FIELD OF THE INVENTION

The invention concerns a method allowing for detection of leaky rods inside a previously irradiated nuclear fuel assembly enabling this method to be used.

BACKGROUND OF THE INVENTION

In nuclear pressurized water reactors with pressurized water, boiling water or reactors cooled by liquid metal, the nuclear fuel exists in the form of pellets stacked in clads sealed at their extremities by plugs so as to constitute elementary rods combined into a bundle by means of a frame in order to form nuclear fuel assemblies each constituting a handling unit.

After the reactor has been in operation for a certain period of time, it is stopped so that one part of the assemblies constituting the core is replaced by new assemblies and so that the assemblies remaining inside the core are moved. During these operations, it is customary to mark the assemblies containing one or more leaky rods.

In the current state of the art, the marking of the assemblies is carried out by analysing the release of radioactive substances during an operation known as a "helium leak test". This technique allows for the marking of assemblies containing leaky rods and, in certain cases, quantifying the amount of leakage from the rods they contain. However, this technique does not mention the localization of effectively defective rods inside the assemblies.

In the particular case of pressurized water and boiling water reactors, the means are known on how to detect the defective rods inside an assembly by marking the rods containing water. Indeed, in the case where the rod sheath is ruptured, the differential pressure between the water of the reactor primary system and the inert gas contained in the rod results in water penetrating inside the rod. Water inside the rods can be detected either by studying the transmission of ultrasonic waves in the upper part of the rods normally filled with gas, or by analysing the damping of waves during a propagation along the rod. This last technique is illustrated in the document FR-A-2 573 906.

However, these two techniques for detecting leaky rods inside nuclear fuel assemblies present different drawbacks. Firstly, their application is limited to the case of water reactors. Moreover, the first technique is effective only if the plenum which is normally filled with gas at the upper part of the rods is fully filled with water, which is not always the case. Finally, the second technique becomes practically ineffective when the clad-pellet gap is reduced, i.e. when the irradiation period exceeds a certain threshold.

SUMMARY OF THE INVENTION

The specific object of this invention relates to a new method for detection leaky rods inside a nuclear fuel assembly and whose principle rests upon the fact that the leaking from a rod is revealed by a discharge of the gas it contains during depressurization of the primary system resulting from a stoppage of the reactor, which enables this method to be used with all types of reactors and thus overcome the drawbacks of methods based on a detection of water possibly inside the rods.

The object of the invention also relates to an installation for implementing this method.

More precisely, the invention proposes a method for detecting leaky rods inside a nuclear fuel assembly comprising a normally sealed bundle of rods containing pressurized gases, wherein it consists of:

subjecting the assembly to a pressure lower than the pressure of the gases contained inside the rods so as to remove the gases from the leaky rods;

causing to vary the temperature of the gases between two given values; and simultaneously measuring, as regards each rod, a deformation generated by causing to vary the temperature of the gases in order to distinguish the leaky rods virtually free from deformation from the seal rods which get out of shape.

In practice, the assembly is subjected to a pressure lower than the pressure of the gases contained inside the rods by simply depressurizing the primary system and introducing the assembly into a pool. By causing to vary the temperature of the gases contained inside the rods, an elastic deformation of the sheaths of the sealed rods is created, even when the sheaths of the leaky rods are virtually not deformed. By measuring the deformation of the sheaths and preferably the diametral deformation, the defective rods can thus be detected and localized since they are the only ones which are not deformed.

Preferably, the temperature of the gases is made to vary by heating the upper part of the assembly in which are the plenums of the rods containing the largest amount of gases. In order to clearly distinguish the leaky rods, the temperature of the gases is preferably raised to at least about 50° C.

In order that the measurement of the diametral deformation of the rods does not take into account a deformation resulting from the thermal expansion of the sheaths, a measurement is preferably effected on the lower part of each rod. Indeed, this part virtually remains isothermal at the temperature of the water of the pool when only the upper part of the assembly is heated.

The invention also concerns an installation for detecting leaky rods in a nuclear fuel assembly comprising a bundle of normallyed seal rods containing pressurized gases, wherein said installation comprises inside the assembly receiving pool a means to vary the temperature of the gases between two given values and a device to measure the deformation created on each rod by said means in order to vary the temperature, this measuring device enabling the leaky rods virtually free from deformation to be distinguised from the sealed rods which warp.

To vary the temperature of the gases, the upper part of the assembly is preferably placed inside a heating sleeve in which a preheated gas or water can be made to circulate.

The measuring device, which preferably detects the diametral deformation of each rod, may in particular be mounted on a support fitted with positioning means on the lower part of the assembly by means of a table driven by orthogonal horizontal movements.

In a preferred embodiment of the invention, the measuring device comprises parallel blades suitable for being inserted on both sides of the rods, and sensors mounted on these blades and located in such a way so that two sensors are disposed on both sides of each rod when the blades are inserted in the assembly.

The sensors may be either deformation gauges borne by flexible dampers integral with the blades and suitable for being brought into contact with the rods, or capacitive sensors rigidly secured to the blades and suitable for being spaced from the rods.

BRIEF DESCRIPTION OF THE DRAWINGS

There now follows a description given by way of example and by no means restrictive of a preferred mode of the invention with reference the annexed drawings in which:

FIG. 1 is a longitudinal cross-sectional view showing a fuel rod of a nuclear fuel assembly;

FIG. 2 is a side view diagrammatically showing an installation for detecting leaky rods inside a nuclear fuel assembly, this assembly being embodied according to the invention;

DETAILED DESCRIPTION OF THE PREFERRED EMBODIMENTS

Figure 3:
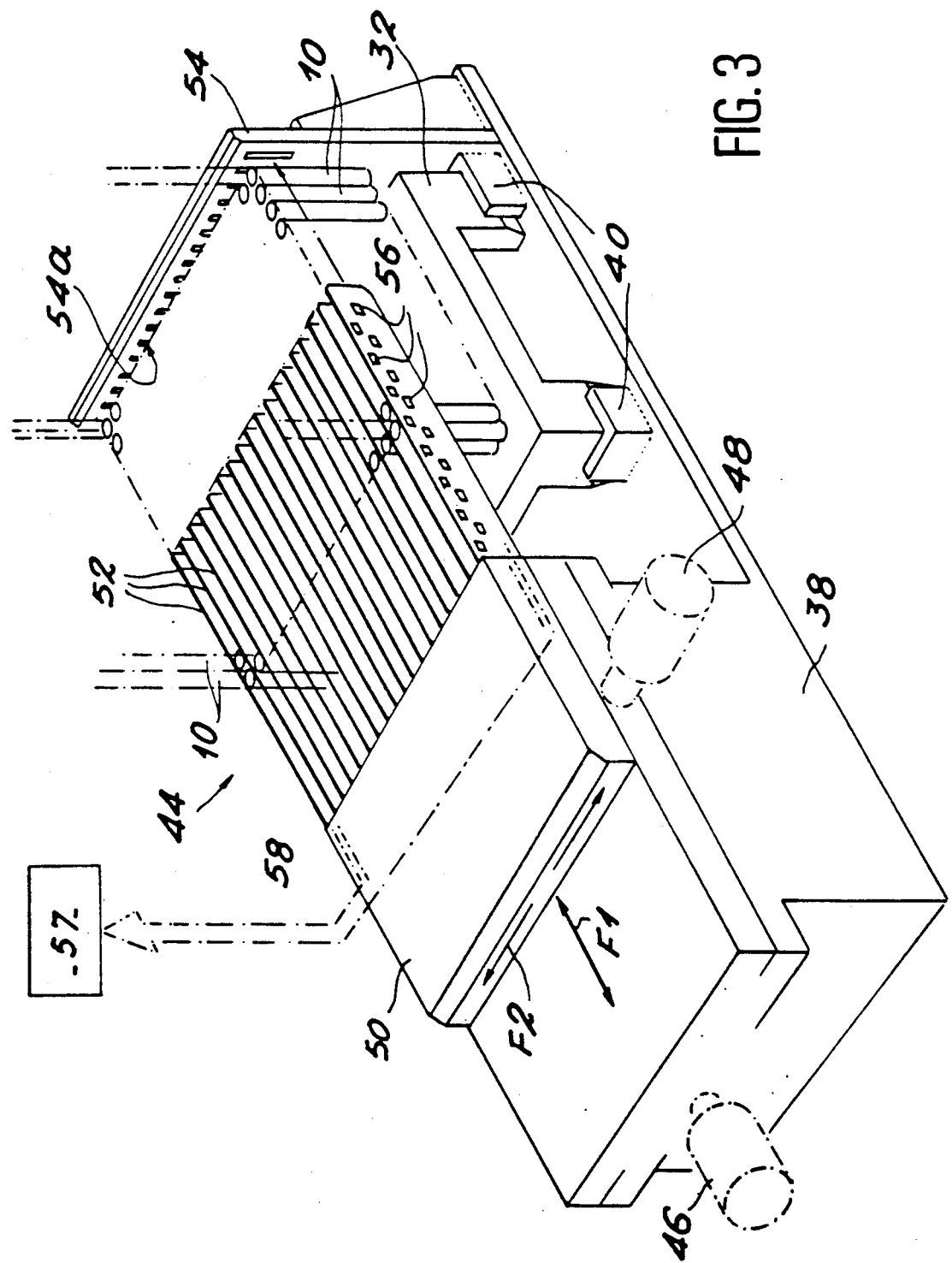
FIG. 3 is a perspective view showing the lower part of the installation of the FIG. 2, including in particular the device for measuring the diametral deformation of the rods of the assembly.

FIG. 1 shows a fuel rod whose structure is well known by specialists of nuclear reactors. Such a rod denoted generally by the reference 10 comprises a tubular duct 12 inside which is housed a stack of nuclear fuel pellets 14. The sheath is imperviously sealed off at its lower end by a plug 16 and at its upper end by a plug 18. Pellet Stacking 14 is maintained against the lower plug 16 by a helicoidal compression spring 20 taking support on the upper plug 18. The spring 20 is placed in a plenum 22. Inert pressurized gases are also present inside the sheath 12, i.e. mainly in the plenum 22 and the gaps formed between the adjacent pellets 14 and between these pellets and the sheath 12.

As shown diagramatically on FIG. 2 and still in a known way, a nuclear fuel assembly 24 includes a bundle of rods 10 interlinked by a rigid frame. This frame consists of spacing grids 26 and guide tubes 28 disposed amongst the rods 10 and connecting between them the grids 26, an assembly head 30 secured to the lower extremities of the guide tubes and an assembly base 32 secured to the lower extremities of the guide tubes. Both the rods 10 and the guide tubes 28 are disposed in rows according to a usually square pitch grid and spaced from each other by a predetermined distance.

When the assembly 24 is placed into the core of a functioning nuclear reactor, the pressure governing in the primary system of the reactor is mainly greater than the pressure of the gases contained in the rods 10. On the other hand, when the primary system is depressurized at the time the reactor is halted, the pressure of the gases present in the rods becomes greater than the external pressure. In the case of leaky rods, the internal pressure of these rods is then balanced with the external pressure, which is expressed by an output of the gases initially contained inside these rods. On the other hand, the pressurized gases present in the leaky rods all remain inside these rods.

In actual fact, the invention rests on this observation and consists of revealing the existence of the pressurized gases in the sealed rods and in the absence of the pressurized gas in the leaky rods. More precisely, the existence of the pressurized gases inside the sealed rods is detected by measuring the elastic deformation of the sheath following a thermal expansion of the gases it contains. When no significant deformation is measured, this reveals that the rod in question is no longer sealed.

In order to carry out their examination with a view to detecting the leaky rods according to the principle which has just been briefly described, the assemblies 24 are first of all introduced into a working pool 36 filled with water 34, only one part of said pool being shown on FIG. 2. This pool contains one or more detection installations according to the invention. The pressure existing there is less than the pressure of the gases normally contained inside the rods so that escape of the gases outside the leaky rods may effectively occur.

The actual detection installation includes a support 38 placed inside the bottom of the pool 36 and is fitted with positioning snugs 40 between which the base 32 of an assembly 24 to be examined is nested.

The detection installation also includes a heating hood 42 suitable for covering the upper part of the assembly 24 whose base is nested between the positioning snugs 40.

As shall be seen subsequently, the heating device 42 makes it possible to vary the temperature of the gases contained in the rods between two given values. This device is mobile so as to be able to be retracted when placing the assembly 24 on the positioning device 40 and then being brought into the functioning position on the upper part of the assembly, as shown by FIG. 2.

Finally, the detection installation according to the invention includes a measuring device 44 mounted on the support 38 and whose conception enable it to monitor the diametral deformations of the rods 10 at the lower extremity of the latter.

All the immersed parts of the installation are made of non-oxidizing materials, such as stainless steel.

As the temperature of the water 34 contained in the pool is constant and is usually between 30° C. and 40° C., the sleeve 42, which covers the upper part of the assembly 24, is conceived so as to progressively raise the temperature of the gases contained in the rods 10 by at least about 50° C. The temperature rise effectively carried out is calculated by taking account of the initial filling pressure of the rods, the fisson gas release rate of the pellets inside the rods, the cubical expansion of the gases and the elastic deformations imposed on the sheath. In the most usual conditions, this calculation leads to a diameter variation of about one micrometer for a temperature variation of 50° C. This value is sufficient in most cases so as to distinguish the leaky rods from the sealed rods. However, it may be increased in certain special cases.

When the temperature variation desired to be obtained is between 50° C. and 60° C., the water, firstly heated inside an annexed device (not shown) such as a heat exchanger, is made to circulate inside the sleeve 42.

On the other hand, when it is desired to obtain a temperature variation of greater than 60° C., an air or gas current previously heated in an annexed device (not shown) is made to circulate inside the sleeve 42, which has the effect of dewatering the upper part of the assembly 24.

It should be mentioned that the disposition of the sleeve 42 around the upper part of the assembly 24 makes it possible to directly heat the gases contained in the plenum 22 of each of the rods 10 of the assembly by avoiding heating the rest of the rods. By placing the measuring device 44 in the proximity of the lower extremity of the rods 10, it is thus possible to observe the elastic expansion of the sheaths 12 of the sealed rods due to the expansion of the gases it contains without the measurement being affected by the thermal expansion of the sheaths, since the temperature is virtually constant at this level.

With reference to FIG. 3, a more detailed description now follows of the structure of the measuring device 44, as well as its mounting onto the support 38.

This figure shows that the support 38 mainly comprises a horizontal plate on which project are V-shaped positioning snugs 40 inside which the base 32 of the assembly becomes engaged.

The support 38 comprises also means 46 and 48 to move a horizontal table 50 along two orthogonal horizontal directions shown by the arrows F1 and F2 on the figure. When the assembly is positioned on the support 38 by the snugs 40, these directions for moving the table 50 are parallel to the two orthogonal directions defined by the square pitch grid formed by the rods 10 of the assembly. The control means 46 and 48 are sealed electric motors conceived so as to be able to function immersed inside the pool.

The table 50 supports a set of regularly spaced blades 52 disposed inside vertical parallel planes and projecting horizontally towards the assembly 24 from one of the sides of the table 50. More precisely, the number of blades 52, the spacing between these blades, as well as the thickness of the blades, are selected so that one blade may come and be placed or inserted on both sides of each of the rows of the rods 10 of the assembly. In order to achieve this, the number of blades 52 is greater by at least one unit than the number of rows of rods, the spacing between the blades corresponding to the pitch of the grid formed by the rods and the thickness of the blades is less than the distance existing between the rods. Furthermore, the length of the blades 52 is slightly greater than the length of each row of rods 10 of the assembly.

By virtue of these characteristics, when the base 32 of the assembly is placed inside the positioning snugs 40, it is possible by activating the motor 48 to align the blades 52 with the passageways formed between the rows of adjacent rods. Then by activating the motor 46, at the same time all the blades 52 on both sides of the rows of rods 10 are inserted until the extremities of the blades appear on the other side of the assembly and penetrate into the apertures 54a formed in a comb 54 secured onto the support 38 on the side opposite the table 50. This comb 54 is designed to reduce the backlash of the blades 52 during measuring.

Figure 4:
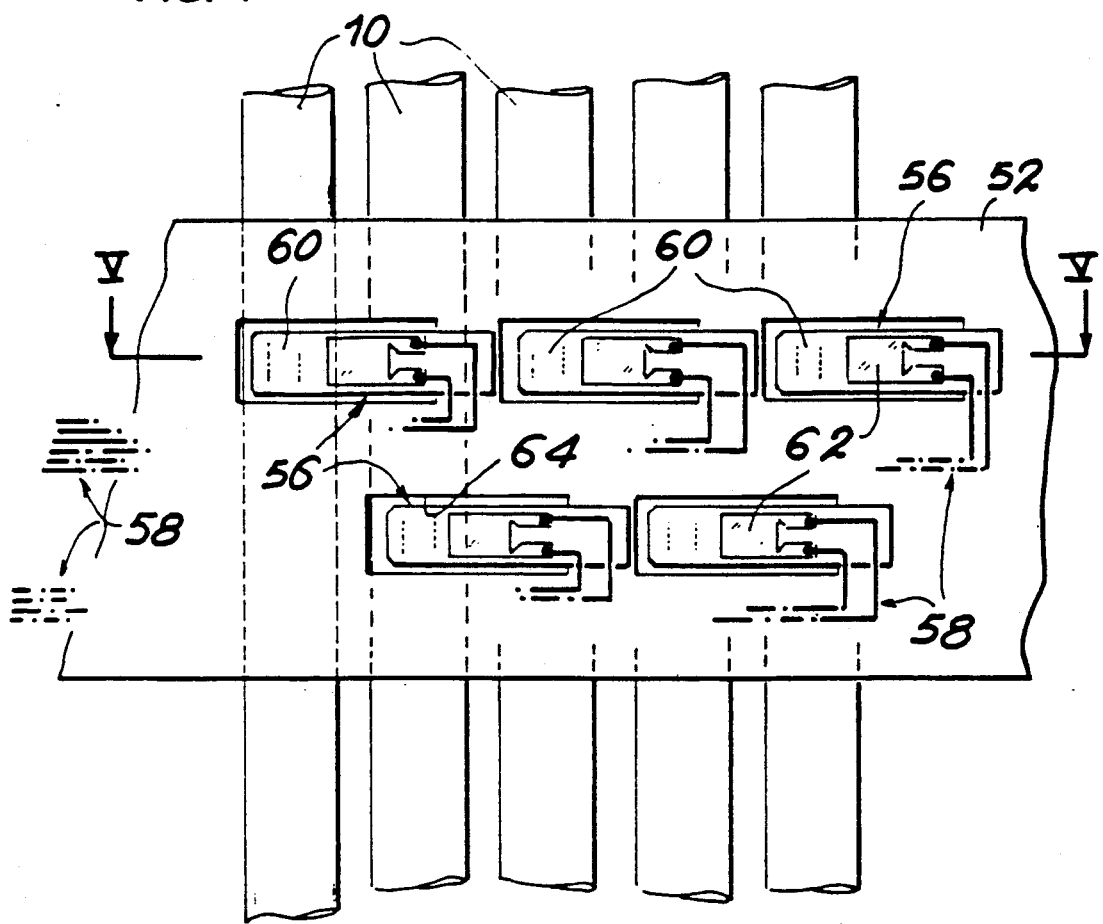
FIG. 4 is a side view of one blade of the measuring device of FIG. 3 illustrating on a larger scale the laying out of the sensors on this blade.
Figure 5:
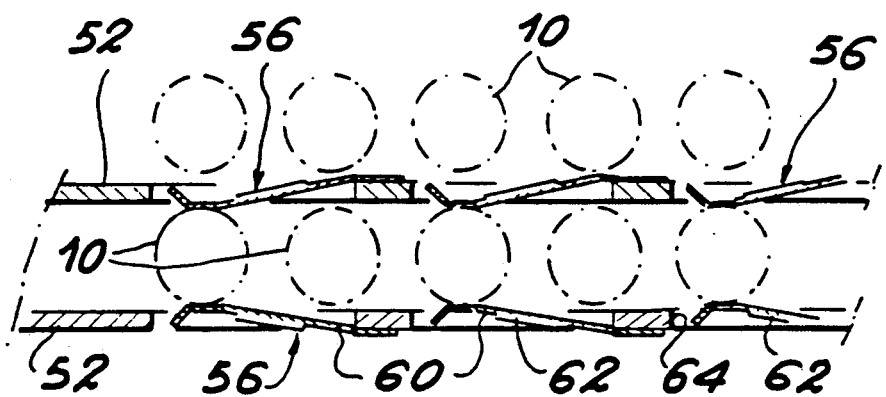
FIG. 5 is a section along the line V—V of FIG. 4.

As clearly shown on FIGS. 4 and 5, each of the blades 52 supports a series of metrology sensors 56. These sensors 56 are disposed so as to appear opposite each of the rods 10 which are adjacent to it when the blades are all introduced into the assembly. In this way and as clearly shown on FIG. 5, each of the rods 10 is placed between two sensors 56 supported by two adjacent blades 52 situated at diametrical locations. Each sensor 56 is connected to external measuring instruments (FIG. 3) by means of jumpers 58 borne by the blades 52.

The pair of sensors 56 associated with each rod 10 makes it possible to measure the diameter of this rod or, more precisely, the variation of this diameter at the time of a rise of temperature of the gases contained in the rods with the aid of the heating sleeve 42. In fact, a relative measurement of the evolution of the diameter of each of the rods during heating of the gases is sufficient so as to differentiate the leaky rods, which hardly get out of shape, from the sealed rods, which undergo a measurable diametral deformation.

So as to take account of the small amount of space available between the rows of adjacent rods in the embodiment example shown on FIGS. 4 and 5, flexible strips 60 are used as sensors 56, said blades having a rectangular shape and each supporting a deformation gauge 62. More precisely, each strip 60 is placed inside a rectangular window 64 of a larger dimension and formed inside the corresponding blade 52 and integral with the latter by virtue of one of its extremities. Furthermore, each flexible strip 60 is folded so that is opposing extremity is situated outside the plane of the blade 52 which supports it and in contact with one of the rods 10 when the blades are placed on both sides of the rods.

Each of the gauges 62 is connected to the external measuring instruments 57 by jumpers 58. Having regard to the small amount of space existing between the rods 10, the sensors 56 are disposed in quinconx on each of the blades 52.

The strips 60 may in particular be made of low thickness stainless steel, the gauges 62 being, for example, deformation gauges with pellicular frames, such as 187 UV, 250 UV Vishay gauges or similar gauges.

In one embodiment variation (not shown here) and also compatible with the small amount of space available between the rows of rods 10, it is also possible to use capacitive sensors secured directly and rigidly onto the blades 52, these sensors not touching the rods 10.

In the embodiment shown on FIGS. 4 and 5 in which the sensors 56 include deformation gauges 62 mounted on flexible strips 60 for a cubic expansion of 1 μm of each rod 10, the device records an apparent deformation of 20.10 whose measurement is easily accessible with the aid of a standard extensometer bridge, such as the Vishay VE 20A bridge.

In order to carry out a parallel measurement of the deformation of all the rods, it is possible to use an automatic acquisition system, such as an HP 3497A standard system fitted with 0.70 measuring drawers or similar drawers.

In practice, when it is desired to control the rods 10 of a nuclear fuel assembly 24, first of all the base 32 of this assembly is placed onto the positioning snugs 40, as shown on FIGS. 2 and 3. Then the heating sleeve 42 is positioned on the upper part of the assembly and the blades 52 are inserted on both sides of the rows of rods of the assembly by means of the motor 46 after having correctly positioned these blades in the alignment of the passageways formed between the rods by means of the motor 48. The installation is then ready for carrying out the desired control.

With the aid of the measuring instruments 57 connected to the various sensors 56 by the jumpers 58 borne by the blades 52, a marking is made of the diameter initially presented by each of the rods 10 of the assembly prior to any heating. Then the gases are progressively heated contained in the plenum 22 of each of the rods of the assembly by means of the heating sleeve 42 so as to increase the temperature of these gases by a value determined in advance and at least equal to about 50° C., as indicated previously.

At the same time, by means of the instruments 57 connected to the sensors, a measurement is made of the diameter variations of each of the rods 10 in the proximity of the lower extremity of the assembly. In this way, the defective rod(s) of the assembly is/are localised and detected, the diameter of said rods remaining virtually unchanged despite the heating carried out by the sleeve 42. In fact, this heating does not result in any thermal expansion of the gases, since these gases have not escaped at the time of depressurizing the primary system of the reactor. On the contrary, the rods in a good state still contain pressurized gases whose heating obtained by means of the sleeve 42 results in their thermal expansion and thus in an elastic deformation of their sheaths which is marked by the sensors 56.

Of course, the invention is not limited to the embodiment just described by way of example, but also covers all its variants.

In particular, instead of simultaneously measuring the diameter of all the rods, the measuring device may also be conceived so as to carry out the measurements per row of rods or rod by rod.

What is claimed is:

1. Method for detecting leaky rods in a nuclear fuel assembly comprising a bundle of rods normally sealed containing pressurized gases, wherein said method consists of:
    subjecting the assembly to a pressure lower than the pressure of the gases contained inside the rods so as to remove the gases from the leaky rods;
    causing the temperature of the gases to vary between two given values; and
    simultaneously measuring for each rod a deformation generated by causing to vary the temperature of the gases so as to distinguish the leaky rods virtually free from deformation from the sealed rods which warp.

2. Method according to claim 1, wherein the temperature of the gases is made to vary by heating the upper part of the assembly.

3. Method according to claim 2, wherein the upper part of the assembly is heated so as to raise the temperature of the gases by at least about 50° C.

4. Method according to any one of claims 1 to 3, wherein a diametral deformation is measured on each rod.

5. Method according to claim 2, wherein a diametral deformation is measured in a lower part of each rod.

6. Method according to claim 1, wherein the assembly is subjected to a pressure lower than the pressure of the gases by placing this assembly in a pool.

7. Installation for detecting leaky rods in a nuclear fuel assembly comprising a bundle of normally sealed rods containing pressurized gases, wherein this installation includes inside a receiving pool of the assembly a device causing the temperature of the gases to vary between two given values and a measuring device for measuring a deformation generated on each rod by said device causing the temperature to vary, this measuring device making it possible to distinguish the leaky rods virtually free from deformation from the sealed rods which warp.

8. Installation according to claim 7, wherein the device to cause the temperature to vary is a heating sleeve suitable for covering the upper part of the assembly.

9. Installation according to claim 8, wherein the heating sleeve heats the water surrounding the upper part of the assembly.

10. Installation according to claim 8, wherein the heating sleeve heats a gas encompassing the upper part of the assembly.

11. Installation according to claim 7, wherein the measuring device is a device measuring a diametral deformation of each rod.

12. Installation according to claim 11, wherein the measuring device is placed close to the lower extremities of the rods.

13. Installations according to claim 12, wherein the measuring device is mounted on a support fitted with positioning means at the lower extremity of the assembly.

14. Installation according to claim 13, wherein the measuring device is mounted on the support by means of an orthogonal horizontal movement table.

15. Installation according to claim 11, wherein the measuring device includes parallel blades suitable for being inserted on both sides of the rods and the sensors supported by these blades so that one pair of sensors is associated to each rod when the blades are inserted inside the assembly.

16. Installation according to claim 15, wherein the sensors include deformation gauges borne by flexible strips secured to the blades and suitable for being brought into contact with the rods.

17. Installation according to claim 15, wherein the sensors are capacitive sensors rigidly secured to the blades and suitable for being spaced from the rods.

* * * * *